United States Patent [19]

Maeda et al.

[11] Patent Number: 4,847,010

[45] Date of Patent: Jul. 11, 1989

[54] PROCESS FOR PREPARING ROSIN ESTER WITH ESTERIFICATION AND HYDROGENATION

[75] Inventors: Masao Maeda, Nishinomiya; Yoshihiro Kodama, Kobe, both of Japan

[73] Assignee: Arakawa Kagaku Kogyo Kabushiki Kaisha, Osaka, Japan

[21] Appl. No.: 149,307

[22] Filed: Jan. 28, 1988

[30] Foreign Application Priority Data

Jan. 29, 1987 [JP] Japan .................................. 62-19329

[51] Int. Cl.$^4$ .............................................. C09F 1/04
[52] U.S. Cl. .................................................. 530/216
[58] Field of Search ................ 260/100, 103, 104, 107

[56] References Cited

U.S. PATENT DOCUMENTS 4,248,770 2/1981 Matsuo et al. ...................... 260/104
4,302,371 11/1981 Matsuo et al. ...................... 260/28.5

FOREIGN PATENT DOCUMENTS 484357 5/1938 United Kingdom ................ 260/100

*Primary Examiner*—Harold D. Anderson
*Attorney, Agent, or Firm*—Armstrong, Nikaido, Marmelstein, Kubovcik & Murray

[57] ABSTRACT

A process for preparing a rosin ester which comprises purifying a rosin and/or a disproportionated rosin, esterifying the resulting purified rosin and/or purified disproportionated rosin with an alcohol and subjecting the esterified rosin and/or esterified disproportionated rosin to hydrogenating. The resulting rosin ester has superior color nearly equal to colorless and is excellent in various properties such as odor at heating, stability and compatibility with organic polymers.

9 Claims, No Drawings

PROCESS FOR PREPARING ROSIN ESTER WITH ESTERIFICATION AND HYDROGENATION

BACKGROUND OF THE INVENTION

The present invention relates to a process for preparing a colorless and odorless rosin ester having a higher thermal stability and weatherability.

Heretofore, rosin esters have been used as tackifiers for hot-melt adhesives and pressure-sensitive adhesives, modifiers for rubbers and plastics, raw materials for traffic paints, or base materials for chewing gum.

Common rosin esters are colored in yellow or yellowish brown, impart their characteristic odor and are poor in thermal stability and weatherability (hereinafter referred to thermal stability and weatherability as stability). As a rosin ester improved in such properties, disproportionated rosin ester or hydrogenated rosin ester which is prepared from disproportionated rosin or hydrogenated rosin is commercially available. However, these rosin esters also do not have sufficient color, stability, and the like.

Japanese Examined Pat. Publication No. 33771/1970 and Japanese Examined Pat. Publication No. 20599/1974 disclose a method for disproportionating rosins or rosin compounds with a specific organic sulfur compound. However, the disproportionated rosins or rosin compounds do not have sufficient color and stability and impart odor.

Japanese Unexamined Pat. Publication No. 9605/1980 discloses a process for preparing rosin esters having a higher stability, comprising purifying a disproportionated rosin as a starting material to remove high molecular weight materials and unsaponifiable materials and esterifying the purified disproportionated rosin with an alcohol. The obtained rosin ester is relatively superior in stability to conventional rosin esters. However, the obtained rosin ester is colored during esterifying and does not have a sufficient stability for heat discoloration. Accordingly, the obtained rosin ester should be improved upon the properties mentioned above.

Japanese Unexamined Pat. Publication No. 230072/1984 discloses a process for preparing a light-colored rosin ester having a higher stability, comprising esterifying a rosin which is purified by distilling with an alcohol in the presence of a specific organic sulfur compound having abilities of both disproportionating and decoloring. However, the obtained rosin ester does not have sufficient color and stability and there is a problem that the obtained rosin ester is odorous which is generated from an organic sulfur compound when the rosin ester is heated.

As mentioned above, any conventional rosin esters have not yet been satisfactory in odor, color and stability at a time and the rosin esters could not have been competed at all in the above properties with hydrogenated petroleum resins which are employed in the same uses of the rosin esters.

In the course of studying to develop a novel process for preparing a rosin ester having improved properties such as color, odor and stability in comparison with those of conventional rosin esters, the present invention has been accomplished.

The process for preparing a rosin ester having improved properties mentioned above has been investigated with giving a consideration of the orders of a process for purifying a rosin and/or a disproportionated rosin each of which is a starting material (hereinafter referred to as "raw rosin"), a process for hydrogenating the raw rosin and a process for esterifying the raw rosin. As the results, it has been found that a rosin ester which is practically colorless and excellent in various properties such as odor at heating, stability and compatibility can be provided by a process for preparing a rosin ester which comprises purifying and then esterifying a raw rosin and subjecting the resultant to hydrogenating. The present invention has been accomplished in accordance with the above results.

These and other objects of the invention will become apparent from the description hereinafter.

SUMMARY OF THE INVENTION

In accordance with the present invention, there is provided a process for preparing a rosin ester which comprises purifying a rosin and/or a disproportionated rosin, esterifying the purified rosin and/or purified disproportionated rosin with an alcohol and subjecting the esterified rosin and/or esterified disproportionated rosin to hydrogenating.

DETAILED DESCRIPTION

The present invention relates to a novel process for preparing a rosin ester having a color nearly equal to colorless and being odorless at heating and excellent in stability. In accordance with the process for preparing a rosin ester, there is provided a rosin ester which cannot be expected from the conventional fixed thought which is derived from the properties of rosin esters. The rosin ester prepared in accordance with the process of the present invention has no inferiorities in comparison with a hydrogenated petroleum resin which is represented as a light-colored resin. Further, the rosin ester has a characteristic of a rosin derivative, that is, high compatibility with various polymers.

The present invention comprises three stages of process, that is, a process for purifying a rosin and/or a disproportionated rosin which are starting materials, a process for esterifying the purified rosin and/or purified disproportionated rosin and a process for subjecting the esterified rosin and/or disproportionated rosin to hydrogenating.

In the instant specification, the term "rosin" which is a starting material is intended to mean gum rosin, wood rosin and tall oil resin, of which main components are resin acids such as abietic acid, palustric acid, neoabietic acid, pimaric acid, isopimaric acid and dehydroabietic acid. It is said that the reason why a rosin ester is colored is that high molecular weight materials and unsaponifiable materials are contained in the raw rosin. Further, among the resin acids, since a resin acid having a conjugated double bond such as abietic acid has a large ability to absorb oxygen and a lower stability, an obtained rosin ester is colored.

From the above-mentioned viewpoints, a raw rosin should be purified and hydrogenated. That is, a purified rosin prepared by purifying a raw rosin is indispensably employed in the present invention.

Accordingly, when a raw rosin which is not purified is subjected to esterifying and hydrogenating, a rosin ester having excellent properties which satisfy the object of the present invention cannot be provided.

In the process of the present invention, a disproportionated rosin which is one of the raw rosins can be easily prepared by a conventional disproportionating manner of a rosin. For instance, the disproportionation is carried out by heating a rosin in the presence of a disproportionating catalyst. Examples of the disproportionating catalyst are, for instance, palladium carbon, powder of metals such as nickel and platinum, iodine, iodides such as iron iodide, and the like. The catalyst is employed in an amount of 0.01 to 5 % by weight, preferably 0.05 to 1.0 % by weight on the basis of the amount of a rosin employed. The heating temperature is 100° to 300° C., preferably 150° to 290° C.

A part of resin acids contained in a rosin can be also disproportionated by heating the rosin at a temperature of 250° to 300° C. for 1 to 5 hours without a catalyst, and the obtained disproportionated rosin can also be preferably used as a raw material in the process of the present invention.

The unpurified disproportionated rosin obtained in the preceding step is then subjected to purification. In the present invention, the term "purification" is intended to mean removing high molecular materials which are presumed to be formed from peroxides contained in the raw rosin employed as a starting material and unsaponifiable materials which are originally contained in the rosin. The purification can be carried out according to usual purification methods such as distillation, crystallization, extraction, and the like. From the viewpoint of purifying the raw material industrially, it is preferable that the rosin is purified by distillation. In case that the rosin is purified by distillation, usually a temperature of 200° to 300° C. and a pressure of 1 to 10 mmHg are employed with giving a consideration of the period of time for distilling. In case that the rosin is purified by crystallization, the crystallization is carried out by preparing a solution of the disproportionated rosin in a good solvent, removing the good solvent to concentrate the rosin and then adding a poor solvent thereto. Examples of the good solvent are, for instance, benzene, toluene, xylene, chloroform, lower alcohols, ketones such as acetone, lower alkyl acetates such as ethyl acetate, and the like. Examples of the poor solvent are, for instance, n-hexane, n-heptane, cyclohexane, isooctane, and the like.

Further, the purified rosin can be also produced by preparing an alkaline solution of the rosin with an alkaline aqueous solution, extracting unsaponifiable materials which are not dissolved in the alkaline aqueous solution with an organic solvent and then neutralizing the extracted aqueous layer.

The purified rosin is then esterified with an alcohol to give a rosin ester as an intermediate. The esterification can be carried out according to usual methods. For instance, it is carried out by preparing the purified disproportionated rosin and the alcohol so that the equivalent ratio of the purified disproportionated rosin to the alcohol is 1:1.5 to 1:0.7, heating the mixture of the purified disproportionated rosin and the alcohol at 150° to 300° C. under ambient pressure in a stream of an inert gas to remove generated water from the mixture. Examples of the alcohol employed in the above process are, for instance, monohydric alcohols such as n-octyl alcohol, 2-ethylhexyl alcohol, decyl alcohol and lauryl alcohol; dihydric alcohols such as ethylene glycol, diethylene glycol, propylene glycol and neopentyl alcohol; trihydric alcohols such as glycerol, trimethylolethane, and trimethylolpropane; and tetrahydric alcohols such as pentaerythritol and diglycerol. As esterifying catalyst is not necessary required at esterfying but it is preferable that the esterifying catalyst is employed to shorten the period of time for esterifying. Examples of the esterifying catalyst employed if desired are acidic catalysts such as acetic acid and paratoluenesulfonic acid, alkaline earth metal hydroxides such as calcium hydroxide, metal oxides such as calcium oxide and magnesium oxide.

The rosin ester thus obtained is then subjected to hydrogenating to give a rosin ester as a final product. The hydrogenation can be carried out according to usual methods. For instance, it is carried out by heating the obtained rosin ester in a closed reaction vessel in the presence of a hydrogenating catalyst under an initial pressure of hydrogen of 50 to 200 $Kg/cm^2$ at a temperature of 100° 1 to 300° C., preferably 200° to 270° C. In the process of the present invention, there is no restriction in the hydrogenation catalysts, and conventional hydrogenation catalysts can be employed. Examples of a hydrogenation catalyst are, for instance, palladium carbon, rhodium carbon and powders of metal such as nickel or platinum. The amount of the hydrogenation catalyst is 0.01 to 5 % by weight, preferably 0.1 to 3 % by weight based upon the amount of the rosin ester.

The rosin ester prepared by the process of the present invention has color almost nearly equal to colorless and superior stability and compatibility with polymers and is odorless. The rosin ester is quite suitable as a tackifier for pressure sensitive adhesives and hot-melt adhesives, modifiers for rubbers and plastics, raw materials for traffic paints, base materials for chewing gum, or modifiers for ink and paints, utilizing those superior properties. When the rosin ester is employed in the above-mentioned uses, marked effects can be exhibited.

The process for preparing a rosin ester of the present invention is more particularly described and explained by means of the following Examples. It is to be understood that the present invention is not limited to the Examples.

EXAMPLE 1

(1) Disproportionation reaction

To 1000 g. of gum rosin from China having an acid value of 172 and softening point (measured by ring and ball method prescribed in JIS-K 5902, hereinafter the same) of 75° C. was added 0.3 g. of palladium charcoal in which 5 % by weight of palladium and 50 % by weight of water were contained (hereinafter referred to as "a 5 % palladium charcoal") as a catalyst. The mixture was subjected to disproportionation by agitating at 280° C. for 4 hours in an atmosphere of nitrogen to give a disproportionated rosin having an acid value of 157, a softening point of 77° C. and a Gardner color of 8. (2) Purification The disproportionated rosin obtained in the above (1) was distilled under a pressure of 3 mmHg. in an atmosphere of nitrogen to give a purified disproportionated rosin in a main fraction. The results are shown in Table 1.

TABLE 1

| | Distilling temperature (°C.) | Still pot temperature (°C.) | Acid value | Yield (%) |
|---|---|---|---|---|
| Initial fraction | <195 | <210 | 57 | 5.0 |
| Main fraction | 195 to 250 | 210 to 280 | 178 | 86.8 |
| Residue | ≧250 | ≧280 | 30 | 8.1 |

(3) Esterification

Five hundred grams of the purified disproportionated rosin having an acid value of 178, a softening point of 83° C. and a Gardner color of 4 (Main fraction) obtained in the above (2) was placed in a four-necked flask and heated up to 180° C. in an atmosphere of nitrogen. After the rosin was melted, agitation was started and 60 g. of glycerol was added to the rosin at 200° C. The mixture was heated up to 280° C. and subjected to esterification at 280° C. for 12 hours to give 515 g. of a purified disproportionated rosin ester having an acid value of 3.4, a softening point of 99° C. and a Gardner color of 5.

(4) Hydrogenation

Two hundred grams of the rosin ester obtained in the above (3) and 2 g. of a 5 % palladium charcoal having a water content of 50 % were charged into a shaking type autoclave having a content volume of 1 l. and then oxygen was removed from the autoclave. The rosin ester contained in the autoclave was compressed with hydrogen under a pressure of 100 Kg./cm² and was heated up to 255° C. Then, the rosin ester was subjected to hydrogenation at 255° C. for 3.5 hours to give 197 g. of a hydrogenation rosin ester having an acid value of 12.6, softening point of 89.5° C. and a Gardner color of 5 (Hazen color of 50 (ASTM-D1686-61).

EXAMPLE 2

(1) Esterification

Five hundred grams of a purified disproportionated rosin obtained in the (2) Purification of Example 1 was placed in a four-necked flask and heated up to 180° C. in an atmosphere of nitrogen. After the rosin was melted, agitation was started and 70 g. of pentaerythritol was added to the rosin at 200° C. The mixture was heated up to 285° C. and subjected to esterification at 285° C. for 12 hours to give 513 g. of a purified disproportionated rosin ester having an acid value of 18.2, a softening point of 111° C. and a Gardner color of 9.

(2) Hydrogenation

Two hundred grams of the rosin ester obtained in the (1) Esterification of Example 2 and 2 g. of a 5 % palladium charcoal having a water content of 50 % were charged into a shaking type autoclave having a content volume of 1 l. Then, the hydrogenation of the rosin ester was carried out in the same manner as described in Example 1 except that the amount of a catalyst, the reaction temperature and the reaction time were changed into 4 g., 270° C. and 5 hours, respectively, to give 195 g. of a rosin ester having an acid value of 20.1, a softening point of 107.5° C. and a Gardner color of not more than 1 (Hazen color of 100).

EXAMPLE 3

The gum rosin from China which was employed in the (1) Disproportionation reaction of Example 1 was distilled in the same manner as described in the (2) Purification of Example 1 to give a purified rosin having an acid value of 181, a softening point of 81° C. and a Gardner color of 4. The results are shown in Table 2.

TABLE 2

| | Distilling temperature (°C.) | Still pot temperature (°C.) | Acid value | Yield (%) |
|---|---|---|---|---|
| Initial fraction | <195 | <210 | 59 | 4.5 |
| Main fraction | 195 to 250 | 210 to 280 | 181 | 87.3 |

TABLE 2-continued

| | Distilling temperature (°C.) | Still pot temperature (°C.) | Acid value | Yield (%) |
|---|---|---|---|---|
| Residue | ≧250 | ≧280 | 30 | 8.2 |

The obtained purified rosin (Main fraction) was subjected to esterification in the same manner as described in the (3) Esterification of the Example 1 to give 510 g. of a purified rosin ester having an acid value of 9.6, a softening point of 91.5° C. and a Gardner color of 5.

Two hundred grams of the obtained purified rosin ester was subjected to hydrogenation in the same manner as described in the (4) Hydrogenation of Example 1 to give 197 g. of a rosin ester having an acid value of 12.4, a softening point of 86.5° C. and a Gardner color of not more than 1 (Hazen color of 100).

COMPARATIVE EXAMPLE 1

The unpurified disproportionated rosin obtained in the (1) Disproportionation reaction of Example 1 was subjected to esterification reaction in the same manner as described in the (3) Esterification of Example 1 to give 505 g. of an unpurified disproportionated rosin ester having an acid value of 4.5, a softening point of 93° C. and a Gardner color of 10. The obtained unpurified disproportionated rosin ester was subjected to hydrogenation in the same manner as described in the (4) Hydrogenation of Example 1 to give 197 g. of a rosin ester having an acid value of 8.5, a softening point of 88° C. and a Gardner color of 6.

COMPARATIVE EXAMPLE 2

The gum rosin from China which was employed in the (1) Dispropornation of Example 1 was subjected to esterification in the same manner as described in the (3) Esterification of Example 1 to give 502 g. of an unpurified disproportionated rosin ester having an acid value of 4.5, a softening point of 86° C. and a Gardner color of 8.

The obtained unpurified disproportionated rosin ester was subjected to hydrogenation in the same manner as described in the (4) Hydrogenation of Example 1 to give 196 g. of a rosin ester having an acid value of 10.1, a softening point of 84° C. and a Gardner color of 7.

COMPARATIVE EXAMPLE 3

Two hundred grams of the purified disproportionated rosin obtained in the (2) Purification of Example 1 was hydrogenated in the same manner as described in the (4) Hydrogenation of Example 1 to give 198 g. of a hydrogenated rosin having an acid value of 172, a softening point of 82° C. and a Gardner color of not more than 1. Twelve grams of glycerol was added to 100 g. of the obtained rosin and then the mixture was subjected to esterification in the same manner as described in the (3) Esterification of Example 1 to give 101 g. of a rosin ester having an acid value of 7, a softening point of 90° C. and a Gardner color of 4.

COMPARATIVE EXAMPLES 4 TO 6

As Comparative Example 4, the unhydrogenated rosin ester obtained in the (3) Esterification of Example 1 was employed.

As Comparative Example 5, the unhydrogenated rosin ester which was an intermediate product in Example 2 was employed.

As Comparative Example 6, the unhydrogenated rosin ester which was an intermediate product in Example 3 was employed.

The rosin esters obtained in Examples 1 to 3 and Comparative Examples 1 to 6 were subjected to the following tests. (Test for thermal stability)

In a glass test tube having an inner diameter of 1.5 cm and a height of 15 cm was put 10 g. of the rosin ester. The test tube was allowed to stand in an air-circulating oven at 200° C. without sealing. The change in the color of the rosin ester was observed at regular intervals. (Test for weatherability)

A Petri dish having an inner diameter of 5.6 cm and a height of 1 cm was charged with 2 g. of the rosin ester having a particle size of 60 to 100 meshes. The Petri dish was irradiated with a 400 watt mercury lamp (Type: H400F) commerically available from TOSHIBA CORPORATION at a distance of 40 cm for 15 hours. The amount of oxygen absorption in the rosin ester (weight gained) was measured and the change in the color (Gardner) of the resin ester was observed.

The color was observed when the rosin ester was dissolved into toluene to give a 50 % toluene solution of the rosin ester.

TABLE 3

| | Thermal Stability | | | Weatherability | | |
|---|---|---|---|---|---|---|
| | | | | Amount of oxygen absorbed | Gardner color | |
| | 0 hr. | 4 hr. | 10 hr. | 24 hr. | (% by weight) | 0 hr. | 24 hr. |
| Ex. No. | | | | | | | |
| 1 | <1 | 2− | 4 | 5 | 0.09 | <1 | 1 |
| 2 | <1 | 2+ | 5 | 6 | 0.20 | <1 | 2 |
| 3 | <1 | 3 | 6 | 7+ | 0.23 | <1 | 2+ |
| Com. Ex. No. | | | | | | | |
| 1 | 6 | 8 | 11 | 12 | 0.30 | 5 | 6 |
| 2 | 7 | 9 | 12 | 13 | 0.29 | 6 | 8 |
| 3 | 4 | 7 | 9 | 12 | 0.32 | 3 | 5 |
| 4 | 5 | 7 | 10+ | 12 | 0.58 | 3 | 5 |
| 5 | 9 | 10 | 11 | 12 | 0.57 | 8− | 9 |
| 6 | 5 | 9 | 12 | 15 | 0.94 | 4 | 6 |

As is clear from Table 3, the thermal stability of the rosin esters of Examples 1 to 3 prepared according to the present invention are, respectively, superior to those of the rosin esters of Comparative Examples 1 to 6, respectively. Furthermore, the color of the rosin esters of Examples 1 to 3 are nearly equal to colorless although the rosin esters are subjected to a test for weatherability.

In addition to the ingredients used in the Examples, other ingredients can be used in the Examples as set forth in the specification to obtain substantially the same results.

What is claimed is:

1. A process for preparing a rosin ester which comprises purifying a rosin, esterifying the resulting purified rosin with an alcohol and subjecting said esterified rosin to hydrogenating.

2. The process of claim 1, wherein said rosin is at least one member selected from the group consisting of gum rosin, wood rosin and tall oil rosin.

3. The process of claim 1, wherein said alcohol is at least one member selected from the group consisting of n-octyl alcohol, 2-ethylhexyl alcohol, decyl alcohol, lauryl alcohol, ethylene glycol, diethylene glycol, propylene glycol, neopentyl alcohol, glycerol, trimethylolethane, trimethylolpropane, pentaerythritol and diglycerol.

4. A process for preparing a rosin ester which comprises purifying a disproportionated rosin, esterifying the resulting purified disproportionated rosin with an alcohol and subjecting said esterified disproportionated rosin to hydrogenating.

5. The process of claim 4, wherein said disproportionated rosin is at least one member selected from the group consisting of disproportionated gum rosin, disproportionated wood rosin and disproportionated tall oil rosin.

6. The process of claim 4, wherein said alcohol is at least one member selected from the group consisting of n-octyl alcohol, 2-ethylhexyl alcohol, decyl alcohol, lauryl alcohol, ethylene glycol, diethylene glycol, propylene glycol, neopentyl alcohol, glycerol, trimethylolethane, trimethylolpropane, pentaerythritol and diglycerol.

7. A process for preparing a rosin ester which comprises purifying a mixture of a rosin and disproportionated rosin, esterifying the resulting purified mixture of a rosin and disproportionated rosin with an alcohol and subjecting said esterified mixture of a rosin and disproportionated rosin to hydrogenating.

8. The process of claim 7, wherein said rosin is at least one member selected from the group consisting of gum rosin, wood rosin and tall oil rosin.

9. The process of claim 7, wherein said alcohol is at least one member selected from the group consisting of n-octyl alcohol, 2-ethylhexyl alcohol, decyl alcohol, lauryl alcohol, ethylene glycol, diethylene glycol, propylene glycol, neopentyl alcohol, glycerol, trimethylolethane, trimethylolpropane, pentaerythritol and diglycerol.

* * * * *